United States Patent [19]
Chasins

[11] 4,106,852
[45] Aug. 15, 1978

[54] PROJECTION SCREEN SUPPORT STRUCTURE

[75] Inventor: Edward A. Chasins, Peekskill, N.Y.

[73] Assignee: Producers Row Inc., New York, N.Y.

[21] Appl. No.: 771,046

[22] Filed: Feb. 22, 1977

[51] Int. Cl.² .............................................. G03B 21/56
[52] U.S. Cl. .................................. 350/117; 38/102.91; 248/165
[58] Field of Search ............. 350/117; 35/53; 40/214; 248/165; 135/15 R, 15 PQ, 3 C, 5 R, 7.1 R; 38/102.8, 102.4, 102.91

[56] References Cited
U.S. PATENT DOCUMENTS

| | | | |
|---|---|---|---|
| 3,255,988 | 6/1966 | Albee, Jr. | 350/117 X |
| 3,942,869 | 3/1976 | Portner et al. | 350/117 |
| 4,017,152 | 4/1977 | Allen | 350/117 |

Primary Examiner—Richard A. Wintercorn
Attorney, Agent, or Firm—Wolder, Gross & Yavner

[57] ABSTRACT

A highly portable projection screen support structure including an extendable center support pole and two extendable side support poles. The structure is adapted to support a very wide horizontally disposed rectangular screen of 4.5 to 1 or greater, or a conventional screen in a planar orientation.

7 Claims, 11 Drawing Figures

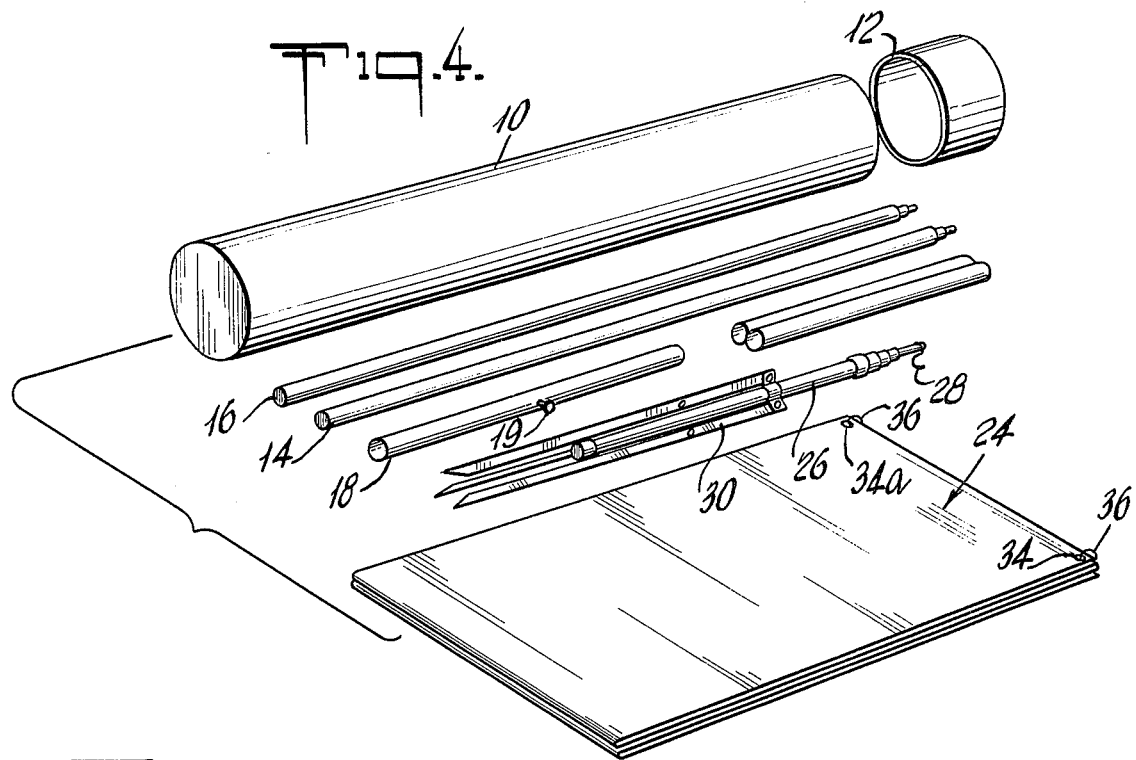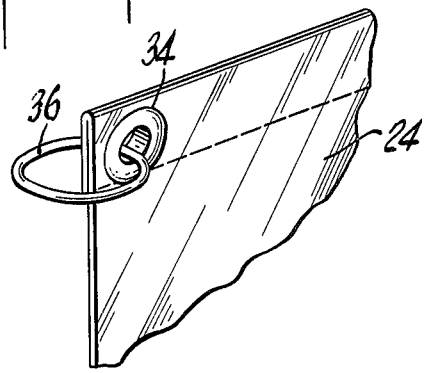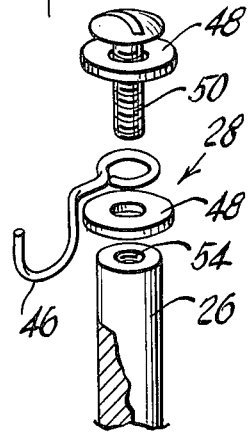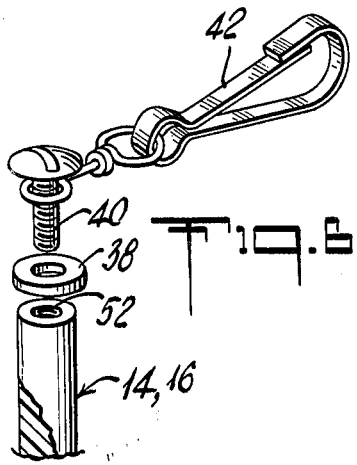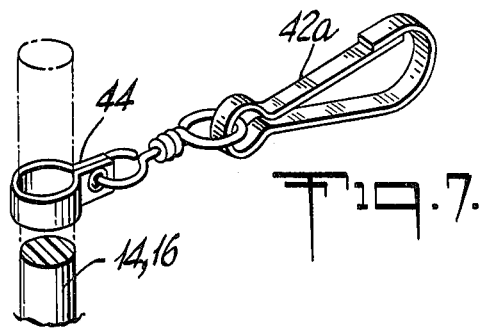

PROJECTION SCREEN SUPPORT STRUCTURE

This invention relates primarily to projection screen support structures and more particularly to such structures for supporting wide rectangular screens.

Projection screen support structures are typically inflexible in terms of the size screen with which they are useful. A common screen support includes a center support pole on a tripod base with the upper end of the pole fastened to a roll-out screen member. The pole is made extendable, but only to increase the measurement of the sides of a rectangular screen. The wider the screen desired, the more extensive is the supporting structure required. Furthermore, the portability of the structure decreases dramatically with the increase in screen width. The inventor knows of no portable structure for screen widths over ten feet.

Also, there is a lack of availability of easily portable screen supporting structures which can accommodate effectively a screen for projecting either wide screen images or a series of horizontally associated still or motion pictures for width-height ratios of 4.5 to 1 or greater.

Accordingly, a primary object of the present invention is to provide a flexible and portable projection screen support structure to support a wide screen.

A further object is to provide a projection screen support structure for adapting to and from wide screen use and regular screen use.

A still further object is to provide a projection screen support structure for tautly supporting a screen.

These and other objects of the present invention are accomplished in a preferred embodiment of the present invention which features a projection screen support structure defining a series of upper and lower support openings. An extendable center pole is fastened to an upper, center support opening of the screen at its one end and at the other end is supported by a tripod base. A pair of extendable, flexible side support poles reverse straddle the screen and are fastened to the screen at one of their end portions and are affixed to a socket at the other of their end portions. The socket is located near the base of the center pole support and the side support poles serve to spread the screen taut horizontally and vertically. An alternative orientation of the support members includes a folded screen and a socket having a pair of openings, so that the other ends of the side support poles extend beyond the socket and each side support pole uses a separate one of said pair of openings. Snap fasteners are used to attach the side support poles to the screen and a hook fastens the center pole. A container is used to house all structure members and the screen for portability.

Other objects, advantages and features of the present invention will be apparent from the following more detailed description of a preferred, but nonetheless illustrative, embodiment of the present invention, with references to the accompanying drawings, wherein:

FIG. 4 is an isometric view of an unassembled array of parts or members of the present invention structure;

FIG. 5 is a partial isometric view of the screen showing a defined opening and a fastening ring therethrough;

FIG. 6 is a view of the end portion of a side support pole of the present invention, partially in section and exploded to indicate affixing of a snap fastener thereto for fastening to the ring of FIG. 5;

FIG. 7 is a view of a mid-portion of a side support pole of the present invention, partially in section and indicating affixing of a snap fastener to hold one of the lower support openings of the screen;

FIGS. 9-11 are a series of assembly views to indicate steps for placing the screen in operational orientation by use of the present invention.

Figure 1:
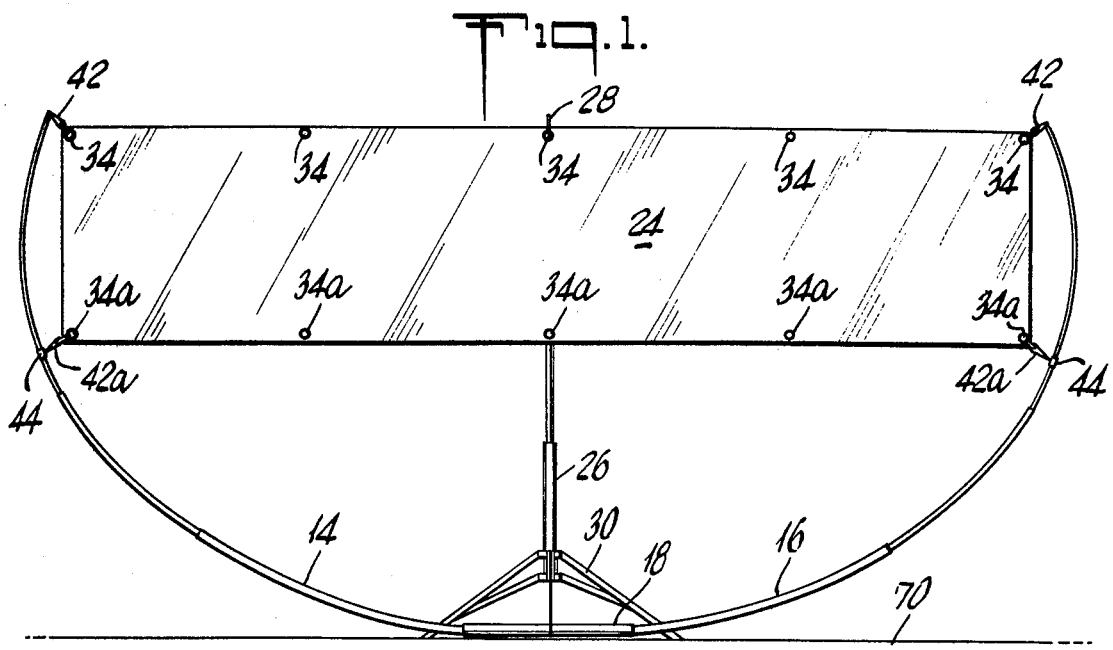
FIG. 1 is a front elevational view of an assembled projection screen support structure according to the present invention and featuring a wide screen single opening, support socket.

Referring to the drawings, and particularly FIG. 4 thereof, the parts or members of the structure of the present invention include structure container 10 in the form of a cylindrical tube having a container cap 12, telescoping side support poles 14, 16 each having three or more lengths of pole telescoped therein, separate sockets 18, 20, the first having a single side pole opening and the second having a pair of side pole openings, a tripod and center support pole combination, jointly designated 22 and a folded projection screen 24. In more detail, the center support pole 26 of combination 22 is expandable by means of telescoping sections and includes hook means 28 at its uppermost end and a standard tripod 30 near its lower end.

Figure 3:
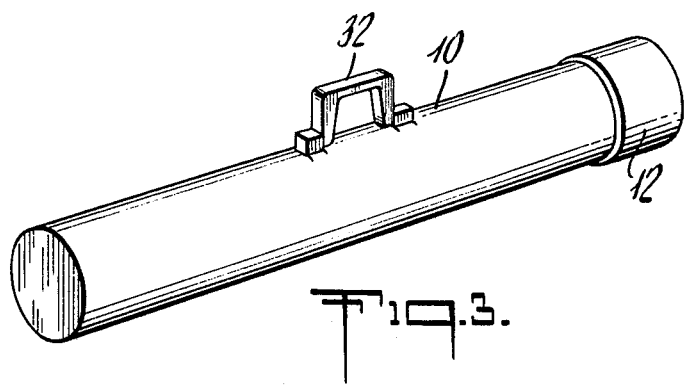
FIG. 3 is an isometric view of a container for unassembled parts or members of the present invention structure.

All of the above parts or members are designed to fit within container 10 with screen 24 adapting to such portable form by being rolled to conveniently fit within the cylindrical shape of container 10. This enables ease of portability of the structure and a handle 32 (FIG. 3) or the like may be attached to container 10 to further facilitate the portability thereof.

Figure 2:
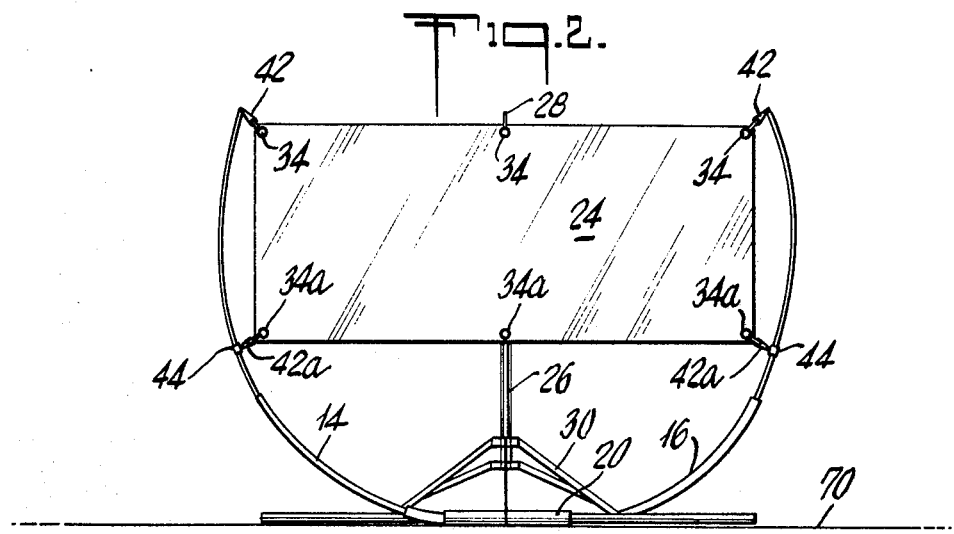
FIG. 2 is also an assembled view similar to FIG. 1, but featuring a regular width screen, double opening, support socket.

Referring to FIGS. 5 through 8, for more detail, it may be seen that screen 24 defines upper support openings 34 and lower support openings 34a (FIGS. 1, 2). Through some of such openings are placed rings 36, whose function it is to fasten the screen to side support poles 14, 16. FIG. 6 shows the end portion of side support poles 14, 16 wherein a fiber-glass material, or another convenient flexible material is used for structuring the side support poles themselves. Washer 38 and screw 40 are affixed at the ends of poles 14, 16 in order to hold snap fasteners 42 in place for mating with rings 36.

FIG. 7 illustrates further snap fasteners 42a held at desired varying positions at a mid-portion of poles 14, 16 by means of clamp 44. These snap-fasteners are intended to fasten screen 24 by means of a ring 36 placed within some lower support openings 34a.

Figure 8:
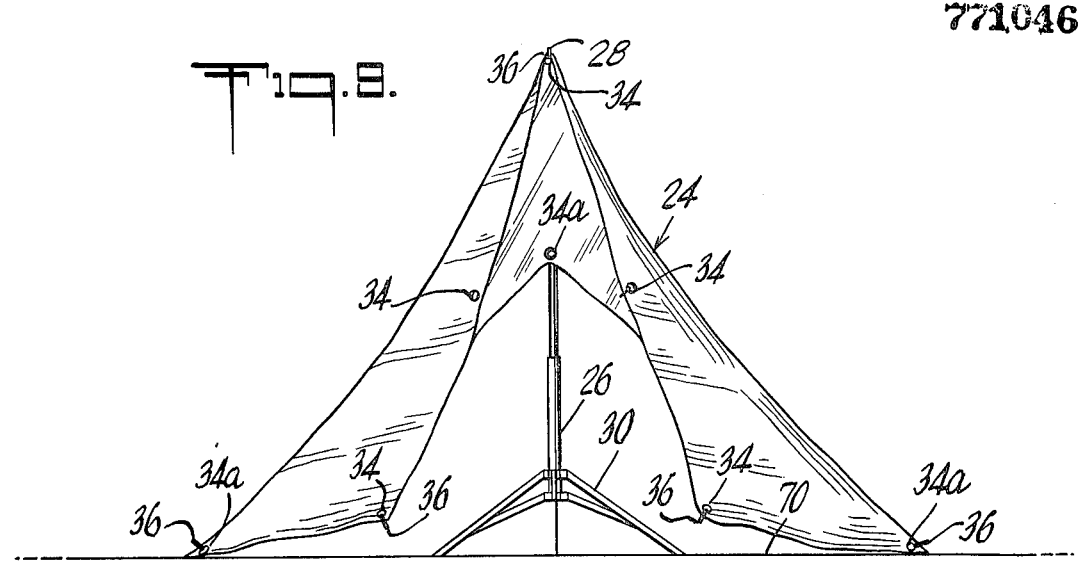
FIG. 8 is a view of the upper end portion of the center support pole of the present invention, partially in section and exploded to indicate affixing of a hook for insertion to the center, upper support opening of the screen.

FIG. 8 shows center support pole 26 with hook means 28 affixed thereto in the form of a hook element 46 held at the top of pole 26 by means of washers 48 and screw 50.

The use of screws 40 (FIG. 6) and 50 (FIG. 8) are facilitated by the provision of hole openings 52, 54, respectively, at the upper most ends of side support poles and the center support pole 26.

Referring now to FIGS. 1 and 2, the use of structural parts or members of the present invention is shown to assemble a projection screen structure according to the present invention. In FIG. 1, for instance, tripod 30 is shown in its support position with center support pole 26 extendable sufficiently so that hook means 28 is of sufficient height to mate with the center upper support opening 34. Single opening socket 18 is placed near the base of center support pole combination 22 with its set screw 19 (FIG. 4) moved all the way into the opening of support socket 18 to act as an end stop for side support poles 14, 16. Side support poles are extendable so that fasteners 42 at the ends of said side support poles are capable of fastening to the outer pair of the end upper support openings 34. Clamps 44 are moved to a convenient position on side support poles 14, 16 so that associated fasteners 42a are in position to fasten to the outer pair of the end lower support openings 34a of screen 24.

FIG. 2 illustrates the capability of this structure with respect to supporting different sized screens. For instance, the screen surface shown in FIG. 2 is about one-half the width of the screen surface shown in FIG. 1. This is accomplished by use of the same screen 24 and the same structural parts, except support socket 20 is used in place of support socket 18 shown in FIG. 1. Support socket 20 includes a pair of parallel openings so that each side support pole 14, 16 is inserted to a different support socket opening and extends therethrough to shorten the width between the top portions of said support poles 14, 16. To accommodate the narrower width support structure, screen 24 has its ends folded behind the middle portion of screen 24 as shown in FIG. 2. This is easily accomplished by using hook 28 through upper end support openings 34 or alternatively using other means to secure the folds.

Thus, it may be seen in FIG. 2 that the medial pairs of the upper and lower end support openings 34, 34a, approximately one-fourth of the screen width from the sides thereof are used in connection with fasteners 42, 42a to fasten the support structure of the present invention to screen 24.

Alternatively, support socket 20 is a universal support socket suitable for both screen widths illustrated in FIGS. 1 and 2. This is accomplished by extending the length of double opening support socket 20 so that one of its openings may be used in connection with set screw 19 (FIG. 4) to support both side poles 14, 16 as shown in FIG. 1. Such a support socket is also used as shown in FIG. 2 by inserting one of the side support poles 14, 16 in each opening.

Figure 10:
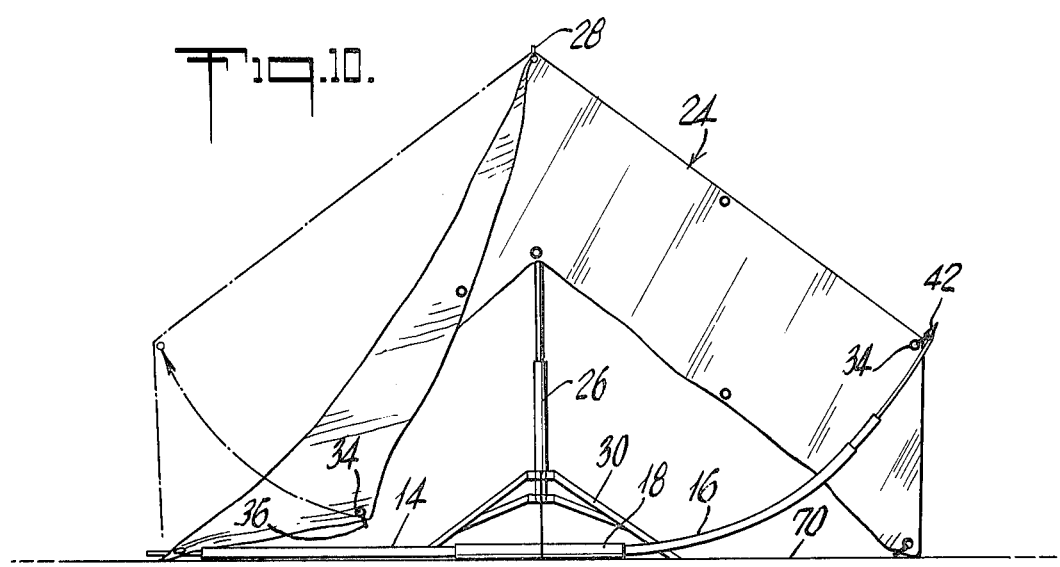
Figure 11:
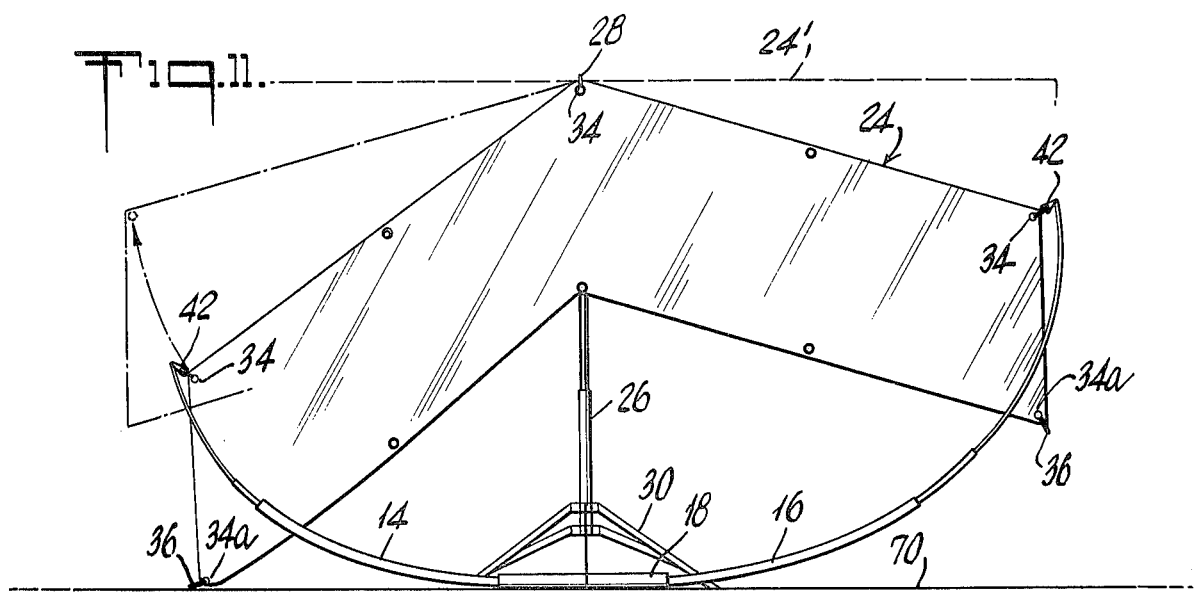

In order to provide a more detailed description of the present invention, a series of detailed assembly steps will now be described with reference to FIGS. 9–11. Three-legged tripod stand 30 is set up on a relatively planar surface 70 and center support pole 26 extended by use of its telescoping structure, so that hook 28 is approximately chest-high to the user. Support socket 20 is then placed on surface 70, centered under tripod 30 and in the plane 24' in which it is desired to erect projection screen 24. Set screw 19 is then fully inserted to the opening of support socket 20 so that it acts as an end stop for side support poles 14, 16. Said support poles 14, 16 are then fully inserted to opposite ends of the opening of support socket 20.

As shown in FIG. 9, ring 36 of center upper support opening 34 is then placed on hook 28. As shown in FIG. 10, side support poles 14, 16 are then slightly extended one at a time and fastened with fasteners 42 to screen 24.

Side support poles 14, 16 are then fully extended in small increments one at a time along with incremental extension of center support pole 26. During this operation tripod 30 and support socket 20 should remain on surface 70. The operation is best illustrated by reference to FIGS. 10, 11 and when full height is reached, fasteners 42a are clamped firmly to side support poles 14, 16 at a proper height to engage rings 36 through lower side support openings 34a. The center and side support poles may then be fine-tuned to remove any wrinkles to obtain a completely flat and taut projection screen.

Additionally, support socket 20 can be moved slightly to level the screen or to tilt the screen toward a low projector to minimize "keystoning".

To disassemble the support structure, the process should be completely reversed with the fasteners 42a first disengaged, the side support poles and the center support poles then compressed, after which fasteners 42 are disengaged. Hook 28 is then removed from screen 24, and the balance of the structure properly folded and compressed to fit within container 10 for easy portability.

Thus, the present invention provides a highly portable structure to support a horizontally disposed narrow rectangular screen in excess of 10 feet, and in fact at widths of 12 feet and greater, where the width to height ratio is 4.5 to 1 or greater. This screen may be easily transported by a single individual, together with projection equipment.

What is claimed is:

1. A projection screen support structure comprising a projection screen defining a plurality of upper and lower support openings, an extendable center support pole fastened to one of said upper support openings, a support socket located near the base of said center support pole, a pair of telescoping side support poles each fastened at its upper end to a pair of said end upper support openings, each fastened also to an associated pair of said end lower support openings and each further held by said support socket, said structure adapted and arranged to spread said screen between said side support poles.

2. A projection screen support structure comprising a projection screen defining a plurality of upper and lower support openings, an extendable center support pole fastened to one of said upper support openings, a support socket located near the base of said center support pole, a pair of telescoping side support poles each fastenened at its upper end to a pair of said end upper support openings, each fastened also to an associated pair of said end lower support openings and each further held by said support socket, said structure adapted and arranged to spread said screen between said side support poles, said support socket being elongated and defining a pair of side pole openings, said side poles each extending through said socket and beyond at both ends thereof and said screen being folded and fastened to itself to reduce the extent thereof.

3. A projection screen support structure comprising a projection screen defining a plurality of upper and lower support openings, an extendable center support pole fastened to one of said upper support openings, a support socket located near the base of said center support pole, a pair of telescoping side support poles each fastened at its upper end to a pair of said end upper support openings, each fastened also to an associated pair of said end lower support openings and each further held by said support socket, said structure adapted and arranged to spread said screen between said side support poles, said support socket being elongated and defining a single side pole opening into which both side poles are mounted.

4. A projection screen support structure comprising a projection screen defining a plurality of upper and lower support openings, an extendable center support pole fastened to one of said upper support openings, a support socket located near the base of said center support pole, a pair of telescoping side support poles each fastened at its upper end to a pair of said upper support openings, each fastened also to an associated pair of said end lower support openings and each further held by said support socket, said structure adapted and arranged to spread said screen between said support poles, a structure container being provided and each element being reducible in size to fit within said container.

5. A projection screen support structure conprising a projection screen defining a plurality of upper and lower support openings, an extendable center support pole fastened to one of said upper support openings, a support socket located near the base of said center support pole, a pair of telescoping side support poles each fastened at its upper end to a pair of said end upper support openings, each fastened also to an associated pair of said end lower support openings and each further held by said support socket, said strucutre adapted and arranged to spread said screen between said side support poles, said side poles being fastened to said screen openings by snap fasteners and said center support pole being fastened to one of said upper support openings by a hook affixed at its base to the upper end of said center support pole.

6. The invention according to claim 5 wherein rings are provided to extend through said support openings.

7. The invention according to claim 1 wherein said screen is a rectangle, said support openings are located at the ends, middle and quarter-length points of the long sides of said screen.

* * * * *